United States Patent Office 2,854,404
Patented Sept. 30, 1958

2,854,404

CATALYTIC REFORMING WITH A MIXED BASE CATALYST

Charles D. Prater and Paul B. Weisz, Pitman, N. J., assignors to Socony Mobil Oil Company, Inc., a corporation of New York No Drawing. Application September 26, 1955
Serial No. 536,758

15 Claims. (Cl. 208—139)

This invention relates to an improved catalytic reforming process for obtaining gasoline of high octane number. More particularly, the present invention is directed to catalytic reforming carried out in the presence of a catalyst consisting essentially of a particularly defined mixture of: (1) particles of a porous carrier impregnated with a small amount of a platinum metal, and (2) particles of porous eta alumina activated by the presence therein of halogen. The invention is further directed to the aforesaid catalyst.

Reforming operations wherein hydrocarbon fractions such as naphthas, gasolines, and kerosine are treated to improve the anti-knock characteristics thereof are well known in the petroleum industry. Reforming is generally carried out by contacting the hydrocarbon charge at an elevated temperature in the presence of hydrogen with a suitable catalyst. The temperature generally employed in reforming is between about 700° F. and about 1000° F. and more usually between about 800° F. and about 975° F. The pressure during reforming is generally within the range of about 100 to about 1000 p. s. i. g. and preferably between about 200 and about 700 p. s. i. g. The liquid hourly space velocity employed, i. e. the liquid volume of hydrocarbon per hour per volume of catalyst, is between about 0.1 and about 10 and preferably between about 0.5 and about 4. In general, the molar ratio of hydrogen to hydrocarbon charge stock employed is between about 1 and about 20 and preferably between about 4 and about 12.

Hydrocarbon charge stocks generally subjected to reforming and those contemplated for use in the process of the invention comprise mixtures of hydrocarbons and particularly petroleum distillates boiling within the approximate range of 60° F. to 450° F., which range includes gasolines, naphthas, and kerosine. The gasoline fraction may be a full boiling range gasoline. It is, however, preferred to use a selected fraction such as naphtha having an initial boiling point of between about 150° F. and about 250° F. and an end boiling point of between about 350° F. and about 425° F.

It has heretofore been proposed to employ platinum metal-containing catalysts for promoting reforming reactions of the type discussed above. Platinum reforming catalysts are necessarily characterized by a certain amount of acidity. One commercially available type of reforming catalyst consists of an alumina base material having platinum metal impregnated thereon, the acidity characteristic being contributed by small amounts of halogen incorporated in the catalyst. In such catalysts, the halogen component is known to be more or less volatile. Activity losses due to halogen loss are irreversible in nature as contrasted with being regenerable. It has previously been found as described in co-pending application Serial No. 445,524, filed July 26, 1954, by Paul B. Weisz, that the acid and platinum activities may reside on separate particles provided the particle size of each does not exceed about 100 microns in diameter.

In accordance with the present invention, there is provided an improved reforming process and catalyst for use therein. Broadly, the catalyst of the instant invention is one consisting essentially of a mechanical mixture of finely divided particles of a porous carrier having deposited thereon a small amount of one or more of the platinum metals, i. e. platinum, palladium, rhodium, osmium, iridium, and ruthenium, and finely divided particles of porous eta alumina, obtained upon calcining beta alumina trihydrate, having incorporated therein an activating amount of halogen, the resulting mechanically mixed catalyst having a minimum dehydrogenation activity (DA) of 50 and a minimum acid activity (AA) of 0.2 as hereinafter defined. The invention also provides a process for reforming hydrocarbon fractions boiling in the gasoline range by contacting them with the above catalyst in the presence of hydrogen under reforming conditions.

It has heretofore been proposed to reform hydrocarbon fractions by subjecting the same under reforming conditions with a catalyst comprising a platinum metal supported on an active cracking component. Thus, it has been taught that a platinum metal deposited on a carrier or support which is inert as regards cracking activity is not an active catalyst for reforming operations. It has been discovered, in accordance with the present invention, that excellent reforming can be achieved in the presence of a catalyst having a platinum metal deposited on an inert carrier when the same is combined in the form of a mechanical mixture with a particular crystallographic form of alumina which has been activated with halogen. It has been found that the crystallographic form of the alumina with which halogen is combined is an important factor influencing the life of the catalyst upon use thereof in reforming operations. Thus, it has been established, in accordance with the present invention, that the loss of halogen, with the accompanying catalyst instability, is due to the nature of the crystallographic form of alumina with which the halogen is initially combined. It has been found, in accordance with the present invention, that the form of alumina capable of affording stable operation upon use in reforming is that identified by X-ray crystallography as eta alumina while the form of alumina which is the less expensive and usual article of commerce is identifiable as essentially chi alumina, or a mixture of the crystallographic forms obtained from alpha alumina trihydrate as shown hereinbelow. Such alumina when impregnated with platinum and halogen, does not afford a stable reforming catalyst. It has been discovered that the instability differences between the above-mentioned forms of alumina are due to differences in halogen retentivity of the two forms of alumina. Thus, the eta form of alumina retains the acidity-producing halogen most tenaciously and the efficiency of the platinum metal component and its catalytic stability are not substantially different on the different types of alumina. In accordance with the above findings, it has been established that an effective reforming catalyst may be employed in which only a portion of the alumina base material constitutes the special form of eta alumina containing the halogen component and where the remainder of the catalyst material containing the platinum metal may be made from an inert carrier such as the inexpensive activated alumina of commerce, i. e. chi alumina or alumina derived upon calcination from alpha alumina trihydrate.

It has been discovered, in accordance with the present invention, that a mechanical mixture of particles of a porous inert carier having platinum metal deposited thereon and particles of eta alumina activated by the presence therein of halogen may be advantageously employed in reforming operations, providing the resultant catalyst composite is characterized by a specified minimum dehydrogenation and acid activity. Thus, it has been found that hydrocarbon fractions having low octane ratings can be converted into hydrocarbon fractions having high octane ratings in good yields by subjecting them to reforming in the presence of hydrogen and a catalyst of the aforesaid character.

The dehydrogenation activation (DA) index characterizing the catalyst described herein measures the catalytic efficiency of the dehydrogenation component of the catalyst. In platinum-containing reforming catalysts, it represents the catalytic strength of the platinum in the form contained on the carrier. In evaluating dehydrogenation activity, a small amount of catalyst sample, for example, 15 milligrams, deposited on a "boat" as 100–200 mesh powder is introduced into a glass reactor tube. Cyclohexane and hydrogen at atmospheric pressure are passed over the catalyst at a rate of 55.2 cc. liquid cyclohexane per hour and hydrogen in a molar ratio of 4:1 of hydrogen to hydrocarbon. The catalyst temperature is maintained at 806° F. The product liquid is analyzed for benzene by a mass spectrometer and, from its concentration, the rate of formation of benzene in units of $10^{-6}$ moles/second per gram catalyst sample is calculated. The number is designated as the dehydrogenation activity or DA index. The acid activity (AA) index measures the catalytic strength of the acid, i. e., the halogen containing component of the catalyst. The test reaction used is the rate of gas production from cumene (isopropylbenzene), which proceeds at a rate dependent on the acidity of the catalyst. The presence or absence of the platinum component does not interfere significantly with the measurement, which is done at atmospheric pressure in the absence of hydrogen. In evaluating acid acivity, a small amount of catalyst sample, usually about 150 milligrams contained in a "boat" as 100–200 mesh powder is employed. Cumene is passed over the catalyst at a rate of about 100 cc./hour and the reaction rate is obtained directly from the rate of gas production at a catalyst temperature of 788° F. The result is expressed as the acid activity or AA index, such that it expresses the absolute rate of cracking in units of $10^{-6}$ moles of gas per gram of catalyst per second.

It has been established, in accordance with the present invention, that the mechanical catalyst composite consisting essentially of particles of an inert carrier having a platinum metal deposited thereon and particles of eta alumina containing halogen should essentially be characterized by a dehydrogenation activity in an excess of about 50 and an acid acivity greater than about 0.2. More particularly, it is prefered that the dehydrogenation activity be within the range of 100 to 5000 and the acid activity be within the range of 0.2 to 8 and especially within the range of 0.2 to 5.

It is contemplated that the carrier employed as a support for the platinum metal component may be any porous material which is not adversely affected by the temperature conditions of reforming. The carrier desirably has a surface area greater than about 10 square meters per gram and preferably in excess of 30 square meters per gram and may extend up to 500 square meters per gram or more. The term "surface area" as used herein designates the surface area of the carrier as determined by the adsorption of nitrogen according to the method of Brunnauer et al., Journal American Chemical Society 60, 309 et. seq. (1938). The carrier is suitably inert, i. e., it may itself be essentially devoid of or exert negligible catalytic activity under the reaction conditions of reforming. Suitable carriers include single oxides of the metals of groups II–A, III–B, IV–A, and IV–B of the periodic table. Non-limiting examples thereof include zirconia, titania, silica, magnesia, etc. Other suitable inert materials include charcoal, porous glass, porcelain, pumice, coke, activated carbon, bauxite, inert earths, etc. The density of the carrier employed, i. e., the bulk density thereof will usually be within the range of .2 to 2.0 g./cc. and more particularly between about .4 and about 1.2 g./cc.

In particular, it is preferred to employ an alumina carrier for the platinum metal. The alumina carrier may be in the form of a precipitate or a gel. Various forms of alumina either singly or in combination, such as, eta, chi, gamma, theta, delta or alpha alumina may be suitably employed as the alumina carrier. The above nomenclature used in the present specification and claims with reference to alumina phase designation is that generally employed in the United States and described in "The Aluminum Industry: Aluminum and Its Production" by Edwards, Frary, and Jeffries, published by McGraw-Hill (1930). The various above-designated phases of alumina, including occurrence in nature, preparation, phase transitions, crystal structure, and physical properties are described in detail in "Alumina Properties," by A. S. Russell, Aluminum Company of America, Pittsburgh (1953). A preferred embodiment of the invention is the use of inexpensive readily available activated alumina of commerce as the base for the platinum metal. This form of alumina is obtained by the controlled calcination of alpha alumina trihydrate, which occurs naturally and which is also the product of the Bayer process. The decomposition sequence of alpha alumina trihydrate, upon heating 1 hour in dry air, is as follows:

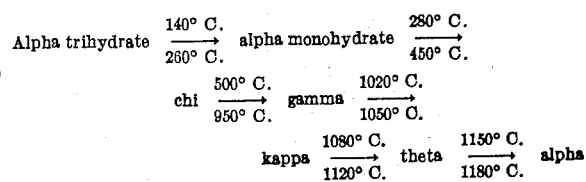

where the upper numbers show the temperature at which the next phase starts to form and the bottom numbers show the temperature at which transformation is complete. Activated alumina contains as its principal constituents chi and gamma alumina, the relative concentration of each depending upon the degree of calcination.

In contrast to the foregoing preferred use of a carrier of inexpensive activated alumina derived from the calcination of alpha alumina trihydrate, is the use of the eta form of alumina, which is obtained upon calcining beta alumina trihydrate. The latter does not occur in nature and accordingly is necessarily produced by synthetic means, such as by treating aluminum chloride solutions with ammonium hydroxide in the cold, followed by syneresis at room temperature, by saturating a solution of sodium aluminate with carbon dioxide at room temperature, or by the action of water on finely divided or amalgamated aluminum. All of these methods for preparing beta alumina trihydrate are relatively expensive. Consequently, the manufacture of eta alumina obtained therefrom is likewise expensive. The decomposition sequence of beta alumina trihydrate, upon heating 1 hour in dry air, is as follows:

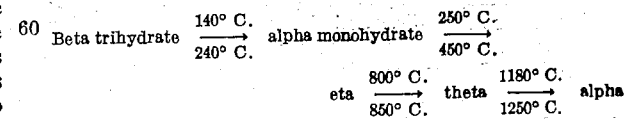

where the upper numbers show the temperature at which the next phase starts to form and the bottom numbers show the temperature at which transformation is complete.

In accordance with the present invention, it has been found that eta alumina retains acidity-producing halogen more tenaciously than various other forms of alumina, such as the chi and gamma aluminas. With use of the present mechanical catalyst mixture, however, the necessary acid activity is divorced from the platinum metal-containing component, permitting a wide choice of porous inert carrier for such metal and making possible use of the readily available activated alumina derived from alpha alumina trihydrate. It is accordingly a particularly preferred embodiment of the invention to employ a carrier of such activated alumina for the platinum metal.

The porous inert carrier serves as a support for a catalytically effective amount of a platinum metal, i. e., platinum, palladium, rhodium, osmium, iridium and ruthenium as well as alloys of these metals. Of the foregoing, platinum and palladium, and in particular platinum, are accorded preference. The amount of platinum metal contained in the ultimate catalyst is generally between about 0.05 and about 5 percent by weight and, in particular, between about 0.1 and about 2 percent by weight.

It has been established, in accordance with the present invention, that, while the platinum metal is suitably deposited on a porous inert support, the acidic portion of the catalyst, that is, the portion containing halogen, should consist of a particular form of alumina, namely, eta alumina. Such form of alumina, as indicated above, is obtained upon calcination of beta alumina trihydrate. This form of alumina has been found to posesses unexpected properties with reference to the retention of added halogen and, in this regard, has the ability to retain halogen to a much greater degree, particularly at the elevated temperatures encountered in reforming, over various other forms of alumina, such as the aforementioned chi and gamma aluminas.

It is contemplated that halogen ion may be added to the eta form of alumina in any feasible manner. However, the halogen should be added in a form which will readily react with the alumina in order to obtain the desired results. One suitable method of adding the halogen is in the form of an acid, such as hydrogen fluoride, hydrogen chloride, hydrogen bromide, and/or hydrogen iodide. Hydrogen fluoride is preferably added in the form of an aqueous solution. Other suitable means for adding the halogen is in the form of volatile salts, such as ammonium fluoride, ammonium chloride, etc. The ammonium ions will be removed during the subsequent heating of the catalyst and therefore will not leave undesirable deposits in the catalyst. Also, the halogen may be added as fluorine, chlorine, bromine, or iodine, or by treatment in gaseous hydrogen halide. The concentration of halogen ion introduced into the eta alumina is such that the ultimate dry catalyst will have a halogen content within the range from about 0.1 to about 8 and preferably from about 0.1 to about 5 percent by weight.

In accordance with the present invention, the weight fraction of inert carrier supporting the platinum metal may vary widely, thereby affording desirable flexibility in the catalyst composition which may be varied with the specific charge stock undergoing treatment and with the particular reaction conditions under which the reforming operation is effected. In general, however, the relative weight fractions of the inert carrier impregnated with a platinum metal and the halogen activated eta alumina component of the instant catalyst is between about 0.1 and about 0.9.

The particle size of the components comprising the catalyst mixture of this invention has been found to be a critical feature thereof. It has been established that, for optimum reforming with the desired catalyst, the average particle size of each of the components making up said catalyst should be less than about 100 microns. It is accordingly contemplated that the catalyst of this invention will in general comprise particles having a diameter below 100 microns and particularly a diameter in the approximate range of 1 to 100 microns.

Without being limited by any theory, it is believed that the optimum results achieved herein with finely divided particles are due to the accomplishment of the two reactions important in reforming, namely, isomerization and aromatization, by way of olefinic intermediates in accordance with the following reaction steps:

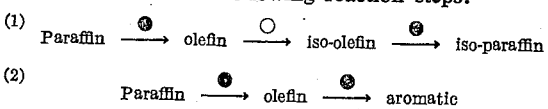

It is believed that each reaction step marked by ● takes place on a dehydrogenation center, such as a platinum metal, while each step marked by ○ takes place on an acid catalyst center. It is postulated that the two components comprising the instant catalyst mixture, i. e., particles of the platinum metal deposited on an inert carrier and particles of halogen activated eta alumina, should present sufficient reaction surface and be sufficiently proximate to one another that the olefinic intermediates formed during the reaction proceed to the desired isomerized or aromatized end products during the life-time of such intermediates. It has been established that optimum reforming is attained when the particle size of the components making up the instant catalyst is fairly small and specifically less than about 100 microns in diameter.

The catalyst of this invention may be used in the form of discrete particles having the aforesaid requisite diameter, or the components having such particle size may be admixed and pelleted, cast, molded, or otherwise formed into pieces of desired size and shape, such as rods, spheres, pellets, etc., it being essential, however, that each of said pieces is composed of particles of both components having a particle diameter of less than about 100 microns.

The process of this invention can be carried out in any equipment suitable for catalytic operations. The process may be operated batchwise. It is preferable, however, and generally more feasible to operate continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation wherein the catalyst is carried out in suspension in the hydrocarbon charge is well adapted for use with the instant catalyst since pelleting or otherwise shaping of the catalyst components is thus rendered unnecessary.

The carrier for the platinum metal component of the instant catalyst, as indicated hereinabove, is inert with respect to the reforming of hydrocarbons, i. e., it is not effective in catalytic reforming operations under the conditions of the process of this invention. A number of platinum-containing reforming catalysts have heretofore been proposed wherein the platinum metal is impregnated on an alumina base. However, inasmuch as the alumina is not acidic, it has heretofore been the practice to combine the alumina upon which the platinum is deposited with promoting agents, such as halogens, boria, and the like. It is well known that such promoters are not permanent but may be lost upon contact with water vapor which is inherently or accidentally contained within the hydrocarbon feed stock.

Utilizing one embodiment of this invention, it is now possible to isolate the halogen-promoted portion of the catalyst since the halogen acid centers are located on separate particles of eta alumina distinct from the particles of inert carrier employed for the platinum metal component. Thus, should a catalyst of the present invention become deactivated due to the loss of halogen therefrom by accidental contact with water vapor, it is only necessary to activate a portion of the catalyst, i. e. the eta alumina particles, by removing the same from the catalyst mixture, treating with halogen to bring the overall halogen content thereof up to the desired amount and subsequently re-combining the halogen treated eta alumina with the platinum metal component. It will be evident that in such manner the portion of the catalyst containing the valuable platinum metal is not subjected to activating or other processing treatment which would serve to induce a loss of the valuable metal.

The platinum metal may be deposited on the carrier in any suitable manner. One feasible method is to admix particles of the carrier with an aqueous solution of an acid of the metal, for example, chloroplatinic acid or the ammonium salt of such acid of suitable concentration. The impregnated particles are then dried and treated with hydrogen at elevated temperatures to reduce the oxide to the metal and to activate the catalyst.

It is contemplated that the halogen-activated eta alumina component of the present catalyst may be produced by treating eta alumina with halogen or a halogen compound by any of the usual methods. Thus, as described above, the eta alumina may be treated with a hydrogen halide or ammonium salt of such acid to introduce into the eta alumina a feasible amount of halogen. As a practical matter, it is generally preferred to utilize fluorine or chlorine in preference to bromine or iodine. The amount of halogen introduced into the eta alumina is such that the halogen content of the ultimate catalyst on a dry basis is between about 0.1 and about 8 percent by weight.

The following examples will serve to illustrate the process of the invention without limiting the same:

Example 1

A catalyst was prepared by impregnating 100 grams of chi alumina with 3.10 grams of chloroplatinic acid solution containing 40 percent by weight of platinum. Contact between chi alumina and impregnating solution was maintained for 48 hours. Thereafter, the impregnated particles were removed, dried in air for 2 hours at 130° C. and ground to approximately 100 mesh (Tyler) or smaller. The resulting powder was treated for 2 hours in air at 510° C. and thereafter treated for 2 hours in hydrogen at 510° C.

The halogen-containing component of the catalyst was prepared by adding to 88.5 grams of powdered beta alumina trihydrate suspended in 100 cc. of water, 126 grams of aqueous HF solution containing 1.19 percent by weight of HF. The alumina powder was maintained in contact with the impregnating solution for 1 hour with agitation. The impregnated powder was thereafter dried in air for 16 hours at 130° C. and thereafter calcined for 2 hours in nitrogen at 200° C.–250° C., followed by treating for 2 hours in nitrogen at 510° C.

The platinum-containing component and the halogen-containing component were mixed in equal weight proportion and ball-milled as a 75 percent by weight water slurry until an average particle size of approximately 5 microns was obtained. The resulting material was dried at 150° C. and pelleted.

The resulting catalyst pellets were charged to a reforming unit operated at 500 p. s. i. g., 10/1 hydrogen to hydrocarbon ratio utilizing a charge stock of naphtha having an octane number of 64.9 and a temperature within the range of 880° F. to 910° F. adjusted to maintain production of 98 octane number (3 cc. of TEL) reformate. The catalyst was stable over a period of 38 days and even at the end of this time showed no tendency of becoming unstable.

Example 2

A catalyst composite was made by the methods employed in Example 1 except that the platinum on chi alumina component was steamed to remove any chlorine introduced therein as a result of impregnating with chloroplatinic acid. 279.5 grams of beta alumina trihydrate were suspended in 200 cc. of water. To this was added 294 grams of aqueous HF solution containing 1.19% by weight of HF to introduce into the alumina an amount of fluorine corresponding to a fluorine content of 1.4 weight percent of the ultimate catalyst on a dry basis. The fluorinated beta alumina was then dried for 16 hours at 135° C. and thereafter heated in nitrogen for 1½ hours at 232° C., 2 hours in nitrogen at 510° C., and 2 hours in hydrogen at 510° C. The platinum-containing component and the halogen-containing component were mixed in equal weight proportion by ball-milling the components in a dry state.

This catalyst, when tested under conditions identical to those employed in Example 1, gave a 98 octane number product when operated at an average inlet temperature to the reactor of 900° F. or an average catalyst temperature of 874° F. with a yield of 10 pounds RVP gasoline of 91.8 volume percent of naphtha charged. This catalyst possessed excellent stability over a period of 25 days and even at the end of this time showed no tendency of becoming unstable.

From the foregoing examples, it will be seen that the mechanical catalyst mixture of this invention consisting of halogen activated eta alumina mixed with platinum impregnated chi alumina is an effective catalyst for use in the reforming of hydrocarbons. In addition to the foregoing, other measurements designed to test and demonstrate the adequacy of the inexpensive chi alumina as a support for the platinum component have been made. In the table below, there is set forth a comparison of samples of platinum impregnated on chi alumina, with platinum impregnated on eta alumina, when these were subjected to severe thermal treatments to test the thermal stability of the catalytic strength of the platinum.

|  | DA | | |
| --- | --- | --- | --- |
|  | Before | After Heat Treatment at 650°C. | After Heat Treatment at 760°C. |
| Platinum on eta alumina | 1,350 | 170 | 18 |
| Platinum on chi alumina (Platinum component of Catalyst of Example 1) | 1,630 | 304 | 250 |

In the above table, the DA index expresses the catalytic dehydrogenation activity of the platinum. It will be seen from the tabulated data that the thermal stability of platinum on chi alumina is as good if not better than the thermal stability of platinum on eta alumina.

The ability to choose the amount of halogen-activated eta alumina and the amount of platinum component making up the ultimate catalyst mixture has the advantage that the amount of acidity, as well as the amount of platinum metal contained in the catalyst, can be controlled not only by the respective concentrations of the halogen and platinum impregnating solutions used but also by the respective amounts of the halogen-promoted eta alumina and the platinum metal component of the catalyst. If the two-component catalyst of this invention is used in the form of a mixture of fluidized particles, the two components of the mixture will be physically independent. Accordingly, a process using catalysts in this form affords complete and immediate flexibility in catalyst composition within the limits set forth hereinabove. Thus in changing types of charge stocks such as between paraffinic and naphthenic stocks, the catalyst composition can be adjusted in accordance with this invention by adding or withdrawing one or the other catalyst component. For example, in transferring to more naphthenic charge stocks, a greater proportion of halogen-activated eta alumina component in the present catalyst mixture will serve to increase the yield of C$_4$+ gasoline. On the other hand, in transferring to paraffinic stocks, a relatively greater emphasis on the platinum metal component is desirable to reduce the cracking reaction and to emphasize dehydrocyclization.

The fact that the platinum metal and halogen-activated eta alumina catalyst components used in the present mechanical catalyst mixtures have generally different properties on the one hand but are seen to be operable as physically independent or separable entities on the other hand affords a basis for improving reforming processes with regard to catalyst regeneration and methods for the recovery of the valuable platinum metal constituents of the catalyst after the same has become catalytically spent.

As regards advantages in regeneration, platinum-containing reforming catalysts of the type heretofore employed in which platinum is impregnated on a cracking base have been regenerated by contacting the spent catalyst with air or other oxygen-containing gas at an elevated temperature sufficient to burn carbonaceous deposits from the catalysts. Careful control of the rate of burning, temperature, and water content of the gas atmosphere during regeneration of such catalysts have been necessary in order not to impair the activity of the catalyst. We have found that conditions and limitations for the operating variables in regeneration are quite distinct and different for the preservation of the acidic and of the platinum activities of such catalysts. For example, the presence of water vapor will cause a loss of halogen concentration resulting in loss of reforming activity, while the platinum itself does not lose its activity. On the other hand high concentration of oxygen and high temperatures will often reduce the effectiveness of the platinum.

By utilizing the mechanical catalyst mixture of this invention, it is possible to provide separate and optimum means for ready regeneration of each of the two components. Thus, the catalyst of the present invention, after becoming spent, may be separated into its components of platinum metal-containing particles and halogen-activated eta alumina particles by providing such components with a suitable different physical characteristic which permits their ready separation, such as a difference in particle size. In those instances where a pelleted composite of halogen-activated eta alumina component and platinum-containing component is employed, the catalyst mixture may be separated into its components by initially crushing to a particle size comparable to or below the magnitude of the small constituent particles and thereafter separating the component particles by flotation, air-blowing, sifting, or by any of the various other known means for separating physically and/or chemically different materials. The separated halogen-activated eta alumina particles and platinum-containing components may then be separately regenerated, under conditions best suited for each.

The present invention thus provides a process for catalytic reforming and a catalyst for use therein consisting of a mechanical mixture of particles of halogen-activated eta alumina and particles of an inert carrier having a platinum metal deposited thereon. It is an essential feature of the invention that the halogen be restricted to the special eta form of alumina and that platinum be deposited on a separate inert carrier, preferably of chi alumina. Thus, a reforming catalyst is provided consisting of a mechanical mixture of particles of alumina activated by halogen and of particles of alumina bearing platinum wherein only the former component constitutes the crystallographic form known as eta alumina.

It is to be understood that the above description is merely illustrative of preferred embodiments of the invention, of which many variations may be made within the scope of the following claims by those skilled in the art without departing from the spirit thereof.

We claim:

1. A process for reforming a hydrocarbon mixture boiling in the gasoline range, which comprises contacting the same under reforming conditions with a catalyst consisting essentially of a mechanical mixture of particles of less than about 100 microns in diameter of: (1) a porous inert carrier having deposited thereon an amount of platinum metal such that the ultimate catalyst has a platinum metal content of between about 0.05 and about 5 percent by weight and (2) eta alumina activated with halogen in an amount such that the ultimate catalyst has a halogen content of between about 0.1 and about 8 percent by weight, the relative weight fractions of the two components being between about 0.1 and about 0.9 and the relationship between said components being such that the resultant mixture is characterized by a dehydrogenation activity of at least 50 and an acid activity of at least 0.2.

2. A process for reforming a petroleum distillate boiling within the approximate range of 60° F. to 450° F., which comprises contacting the same at a temperature between about 700° F. and about 1000° F. at a liquid hourly space velocity between about 0.1 and about 10 in the presence of hydrogen under a pressure between about 100 and about 1000 p. s. i. g. and a molar ratio of hydrogen to hydrocarbon between about 1 and about 20 with a catalyst consisting essentially of a mechanical mixture of particles of less than about 100 microns in diameter of: (1) a porous inert carrier having deposited thereon an amount of platinum metal such that the ultimate catalyst has a platinum metal content of between about 0.05 and about 5 percent by weight and (2) eta alumina activated with halogen in an amount such that the ultimate catalyst has a halogen content of between about 0.1 and about 8 percent by weight, the relative weight fractions of the two components being between about 0.1 and about 0.9 and the relationship between said components being such that the resultant mixture is characterized by a dehydrogenation activity of at least 50 and an acid activity of at least 0.2.

3. A process for reforming a hydrocarbon mixture boiling in the gasoline range, which comprises contacting the same under reforming conditions with a catalyst consisting essentially of a mechanical mixture of particles of less than about 100 microns in diameter of: (1) porous activated alumina derived from alpha alumina trihydrate having deposited thereon an amount of platinum metal such that the ultimate catalyst has a platinum metal content of between about 0.05 and about 5 percent by weight and (2) eta alumina activated with halogen in an amount such that the ultimate catalyst has a halogen content of between about 0.1 and about 8 percent by weight, the relative weight fractions of the two components being between about 0.1 and about 0.9 and the relationship between said components being such that the resultant mixture is characterized by a dehydrogenation activity of at least 50 and a weight activity of at least 0.2.

4. A process for reforming a hydrocarbon mixture boiling in the gasoline range, which comprises contacting the same under reforming conditions with a catalyst consisting essentially of a mechanical mixture of particles of less than about 100 microns in diameter of: (1) porous activated alumina consisting essentially of chi and gamma alumina having deposited thereon an amount of platinum metal such that the ultimate catalyst has a platinum metal content of between about 0.05 and about 5 percent by weight and (2) eta alumina activated with halogen in an amount such that the ultimate catalyst has a halogen content of between about 0.1 and about 8 percent by weight, the relative weight fractions of the two components being between about 0.1 and about 0.9 and the relationship between said components being such that the resultant mixture is characterized by a dehydrogenation activity of at least 50 and an acid acivity of at least 0.2.

5. A process for reforming a petroleum distillate boiling within the approximate range of 60° F. to 450° F., which comprises contacting the same at a temperature between about 700° F. and about 1000° F. at a liquid hourly space velocity between about 0.1 and about 10 in the presence of hydrogen under a pressure between about 100 and about 1000 p. s. i. g. and a molar ratio of hydrogen to hydrocarbon between about 1 and about 20 with a catalyst consisting essentially of a mechanical mixture of particles of less than about 100 microns in diameter of: (1) chi alumina having deposited thereon an amount of platinum such that the ultimate catalyst has a platinum content of between about 0.05 and about 5 percent by weight and (2) eta alumina activated with halogen in an amount such that the ultimate catalyst has a halogen content of between about 0.1 and about 8 percent by weight, the relative weight fractions of the two components being between about 0.1 and about 0.9 and the relationship between said components being such that the resultant mixture is characterized by a dehydrogenation activity of at least 50 and an acid activity of at least 0.2.

6. A process for reforming a hydrocarbon mixture boiling in the gasoline range, which comprises contacting the same under reforming conditions with a catalyst consisting essentially of a mechanical mixture of particles of less than about 100 microns in diameter of: (1) chi alumina having deposited thereon an amount of platinum such that the ultimate catalyst has a platinum metal content of between about 0.1 and about 2 percent by weight and (2) eta alumina activated with chlorine in an amount such that the ultimate catalyst has a chlorine content of between about 0.1 and about 5 percent by weight, the relative weight fractions of the two components being between about 0.1 and abou 0.9 and the relationship between said components being such that the resultant mixture is characterized by a dehydrogenation activity of at least 50 and an acid activity of at least 0.2.

7. A process for reforming a hydrocarbon mixture boiling in the gasoline range, which comprises contacting the same under reforming conditions with a catalyst consisting essentially of a mechanical mixture of particles of less than about 100 microns in diameter of: (1) chi alumina having deposited thereon an amount of platinum such that the ultimate catalyst has a platinum metal content of between about 0.1 and about 2 percent by weight and (2) eta alumina activated with fluorine in an amount such that the ultimate catalyst has a fluorine content of between about 0.1 and about 5 percent by weight, the relative weight fractions of the two components being between about 0.1 and about 0.9 and the relationship between said components being such that the resultant mixture is characterized by a dehydrogenation activity of at least 50 and an acid activity of at least 0.2.

8. A process for reforming a hydrocarbon mixture boiling in the gasoline range, which comprises contacting the same under reforming conditions with a catalyst consisting essentially of a mechanical mixture of particles of less than about 100 microns in diameter of: (1) chi alumina having deposited thereon an amount of platinum such that the ultimate catalyst has a platinum content of between about 0.1 and about 2 percent by weight and (2) eta alumina activated with fluorine in an amount such that the ultimate catalyst has a fluorine content of between about 0.1 and about 5 percent by weight, the relative weight fractions of the two components being substantially equal and the relationship between said components being such that the resultant mixture is characterized by a dehydrogenation activity of between about 100 and about 5000 and an acid activity of between about 0.2 and about 8.

9. A catalyst consisting essentially of a mechanical mixture of particles of less than about 100 microns in diameter of: (1) a porous inert carrier having deposited thereon an amount of platinum metal such that the ultimate catalyst has a platinum metal content of between about 0.05 and about 5 percent by weight and (2) eta alumina activated with halogen in an amount such that the ultimate catalyst has a halogen content of between about 0.1 and about 8 percent by weight, the relative weight fractions of the two components being between about 0.1 and about 0.9 and the relationship between said components being such that the resultant mixture is characterized by a dehydrogenation activity of at least 50 and an acid activity of at least 0.2.

10. A catalyst consisting essentially of a mechanical mixture of particles of less than about 100 microns in diameter of: (1) porous activated alumina derived from alpha alumina trihydrate having deposited thereon an amount of platinum metal such that the ultimate catalyst has a platinum metal content of between about 0.05 and about 5 percent by weight and (2) eta alumina activated with halogen in an amount such that the ultimate catalyst has a halogen content of between about 0.1 and about 8 percent by weight, the relative weight fractions of the two components being between about 0.1 and about 0.9 and the relationship between said components being such that the resultant mixture is characterized by a dehydrogenation activity of at least 50 and a weight activity of at least 0.2.

11. A catalyst consisting essentially of a mechanical mixture of particles of less than about 100 microns in diameter of: (1) porous activated alumina consisting essentially of chi and gamma alumina having deposited thereon an amount of platinum metal such that the ultimate catalyst has a platinum metal content of between about 0.05 and about 5 percent by weight and (2) eta alumina activated with halogen in an amount such that the ultimate catalyst has a halogen content of between about 0.1 and about 8 percent by weight, the relative weight fractions of the two components being between about 0.1 and about 0.9 and the relationship between said components being such that the resultant mixture is characterized by a dehydrogenation activity of at least 50 and an acid activity of at least 0.2.

12. A catalyst consisting essentially of a mechanical mixture of particles of less than about 100 microns in diameter of: (1) chi alumina having deposited thereon an amount of platinum such that the ultimate catalyst has a platinum content of between about 0.05 and about 5 percent by weight and (2) eta alumina activated with halogen in an amount such that the ultimate catalyst has a halogen content of between about 0.1 and about 8 percent by weight, the relative weight fractions of the two components being between about 0.1 and about 0.9 and the relationship between said components being such that the resultant mixture is characterized by a dehydrogenation activity of at least 50 and an acid activity of at least 0.2.

13. A catalyst consisting essentially of a mechanical mixture of particles of less than about 100 microns in diameter of: (1) chi alumina having deposited thereon an amount of platinum such that the ultimate catalyst has a platinum metal content of between about 0.1 and about 2 percent by weight and (2) eta alumina activated with chlorine in an amount such that the ultimate catalyst has a chlorine content of between about 0.1 and about 5 percent by weight, the relative weight fractions of the two components being between about 0.1 and about 0.9 and the relationship between said components being such that the resultant mixture is characterized by a dehydrogenation activity of at least 50 and an acid activity of at least 0.2.

14. A catalyst consisting essentially of a mechanical mixture of particles of less than about 100 microns in diameter of: (1) chi alumina having deposited thereon an amount of platinum such that the ultimate catalyst has a platinum metal content of between about 0.1 and about 2 percent by weight and (2) eta alumina activated with fluorine in an amount such that the ultimate catalyst has a fluorine content of between about 0.1 and about 5 percent by weight, the relative weight fractions of the two components being between about 0.1 and about 0.9 and the relationship between said components being such that the resultant mixture is characterized by a dehydrogenation activity of at least 50 and an acid activity of at least 0.2.

15. A catalyst consisting essentially of a mechanical mixture of particles of less than about 100 microns in diameter of: (1) chi alumina having deposited thereon an amount of platinum such that the ultimate catalyst has a platinum content of between about 0.1 and about 2 percent by weight and (2) eta alumina activated with fluorine in an amount such that the ultimate catalyst has a fluorine content of between about 0.1 and about 5 percent by weight, the relative weight fractions of the two components being substantially equal and the relationship between said components being such that the resultant mixture is characterized by a dehydrogenation activity of between about 100 and about 5000 and an acid activity of between about 0.2 and about 8.

References Cited in the file of this patent

UNITED STATES PATENTS

| | | |
|---|---|---|
| 2,369,009 | Block et al. | Feb. 6, 1945 |
| 2,479,109 | Haensel | Aug. 16, 1949 |
| 2,642,381 | Dickinson | June 16, 1953 |
| 2,746,909 | Hemminger | May 22, 1956 |
| 2,780,603 | Burton | Feb. 5, 1957 |